Aug. 25, 1931.  W. L. PAUL  1,820,541
HARROW
Filed March 18, 1929  2 Sheets-Sheet 1
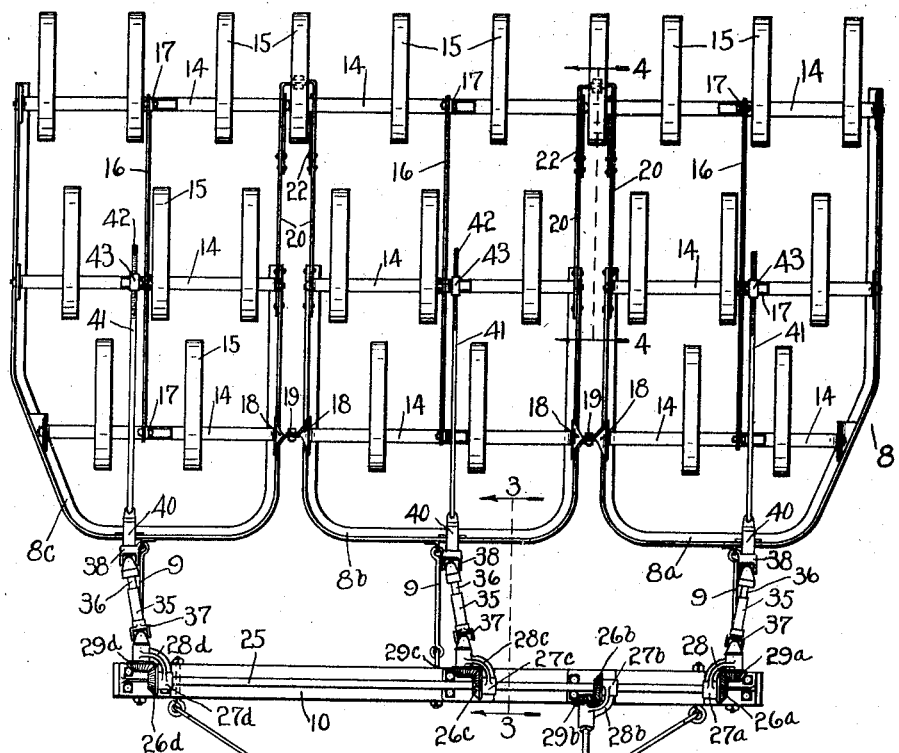
Fig_1
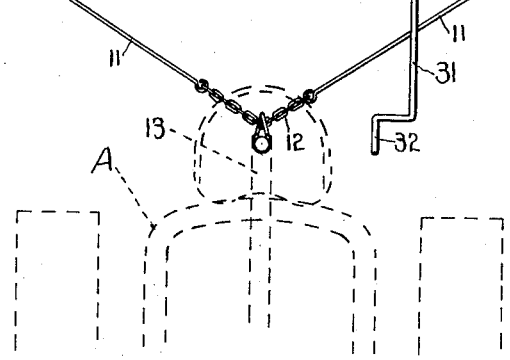
Fig_3
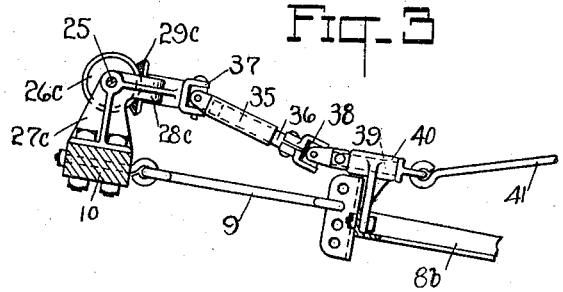
INVENTOR
William L. Paul,
BY Brown, Jackson, Boettcher and Dienner
ATTYS

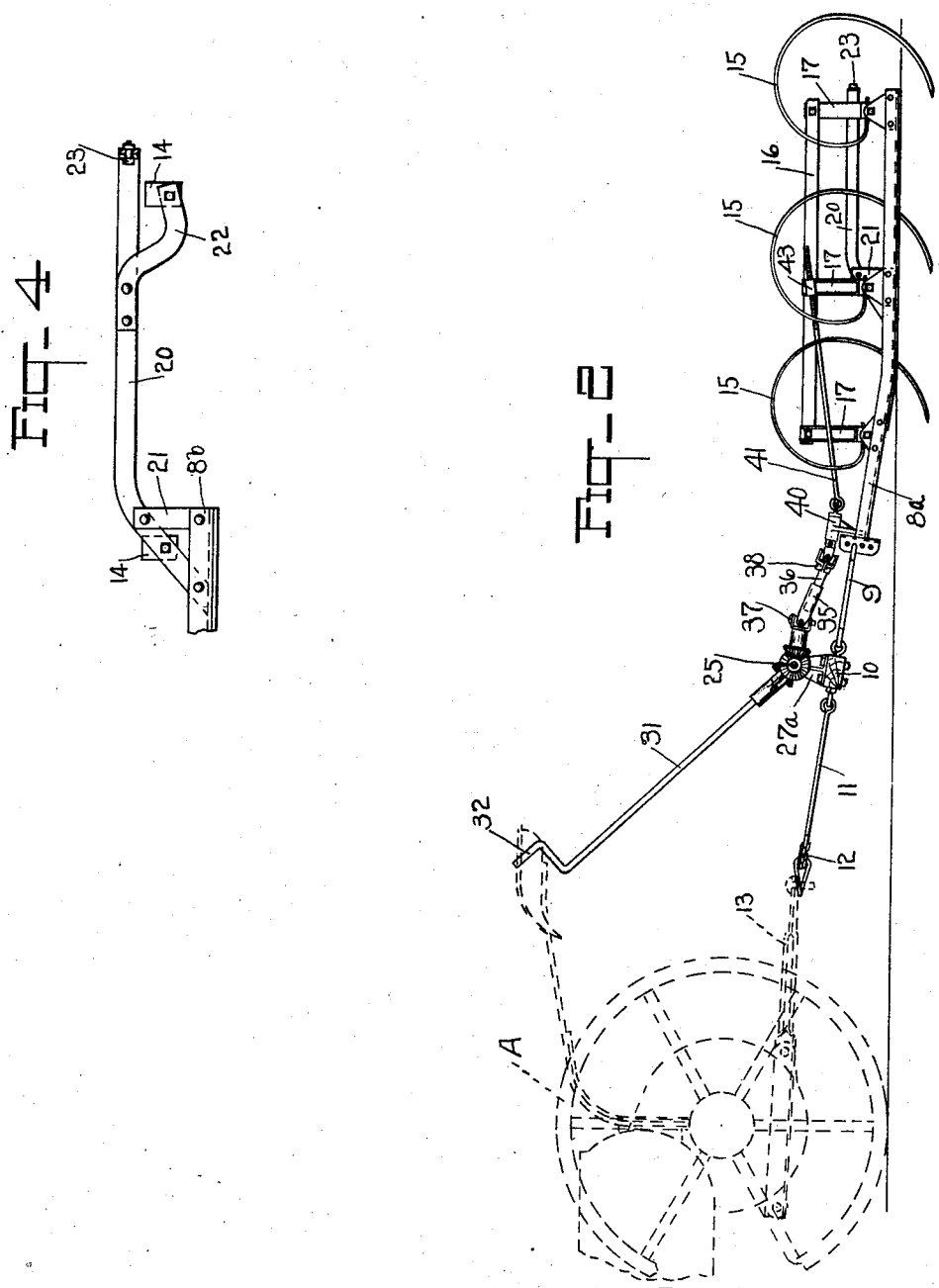

Patented Aug. 25, 1931

1,820,541

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

HARROW

Application filed March 18, 1929. Serial No. 347,831.

This invention relates to improvements in tillage implements of the type adapted to be drawn by a tractor, and more particularly to that class of implements generally known as spring tooth harrows.

The principal object of my invention is the provision of new and improved control means operable by the operator from his seat on the drawing tractor, whereby all the earth working devices carried by a plurality of flexibly connected frame sections or units may be easily and simultaneously operated and controlled while the machine is in motion, to vary the depth adjustment of such earth working devices regardless of variations in the relative positions of the frame sections incident to the operation of the implement.

Another object of my invention is to so mount the control means that it will not be subject to movement to the same degree as are the frame sections, thereby making it easier for the operator to operate it from his seat on the tractor.

Other objects and advantageous features will appear from the following description of the preferred embodiment of my invention illustrated in the drawings and hereinafter described.

In the drawings,—

Fig. 1 is a plan view of the implement with my improved operating means mounted thereon, and illustrating in dotted lines the rear portion of the tractor to which the implement is connected.

Fig. 2 is a side view thereof;

Fig. 3 is a partial longitudinal vertical sectional view taken approximately on line 3—3 of Fig. 1; and Fig. 4 is a similar sectional view taken approximately on line 4—4 of Fig. 1.

Referring to the drawings,—the harrow as a whole is indicated by the reference numeral 8, and comprises a plurality of substantially parallel flexibly connected frame sections 8a, 8b, 8c. Suitably connected to the forward end of each frame section and extending forwardly therefrom is a link 9, the forward ends of the several links being connected to a transversely extending evener bar 10, as shown. Secured to and extending forwardly from opposite ends of the evener bar 10 are draft links 11, the forward ends of which are connected to opposite ends of a chain 12 which is suitably connected to the draw bar 13 of a drawing tractor A, fragmentarily shown in dotted lines.

Extending transversely of each of the frame sections 8a, 8b, 8c are a plurality of tooth carrying bars 14 of any approved type, and on each of said tooth carrying bars are mounted a plurality of the usual spring teeth 15. In the construction shown each of the frame sections is provided with three tooth carrying bars, but it is to be understood that any desired number may be employed. As usual in this class of implements said tooth carrying bars are mounted on the frame sections so as to have rocking movement with respect thereto to raise and lower the harrow teeth.

The various tooth carrying bars 14 of each frame section are operatively connected to a longitudinally extending shifting bar or lever 16, as usual, by suitable standards 17 extending upwardly from said bars, as shown in Fig. 2.

The frame sections 8a, 8b, 8c may be flexibly connected together, to rock relatively to each other about longitudinal axes, in any suitable and convenient way. In the construction illustrated the adjacent side members of the frame sections are shown as being provided near their forward ends with hinge members 18 secured thereto and extending upwardly and outwardly therefrom. These hinge members 18 are pivotally connected together at their upper ends by means of longitudinally disposed pivot bolts 19. The rear portions of the frame sections are also flexibly connected together by longitudinally disposed pivot bolts. Preferably the inner side members of the frame sections 8a and 8c are shorter than the outer side members, and extend back to about midway of the length of the sections, and the two side members of the frame section 8b also extend rearwardly the same distance, (see Fig. 1).

Secured to and extending rearwardly from each of these short side members of the several frame sections in substantial parallelism therewith is a bar 20, (see Fig. 4), and, as shown in said figure, each of these bars provides support for the adjoining ends of the rear tooth carrying bars 14. A vertical standard or brace member 21 connected at its lower end to each of the short side members, and at its upper end with the forward portion of the bar 20 adjacent thereto, holds said bar securely. Attached to and extending downwardly and rearwardly from the intermediate portion of each of the bars 20, as best shown in Fig. 4, is an arm 22, and by means of these arms the adjoining ends of the rear tooth carrying bars 14 are secured to said bars. The rear ends of the adjacent bars 20 of each two frame sections are bent laterally toward each other and overlap, as shown in Fig. 1, and these overlapping portions are secured together by a longitudinally disposed pivot bolt 23 (see Fig. 4). It will thus be seen that the various frame sections are flexibly connected together at both ends, so that they may swing up or down with respect to each other.

Coming now to my improved means for simultaneously operating and adjusting all of the earth working tools in the variable horizontal positions of the frame sections,— 25 indicates a transverse shaft that is rotatably mounted on the evener bar 10, and has suitably keyed thereon so as to rotate therewith a plurality of bevel gears, in the construction shown four of such gears, indicated by the reference numerals 26a, 26b, 26c, and 26d, being provided.

The shaft 25 is journaled adjacent each of said bevel gears in a plurality of bearing brackets 27a, 27b, 27c, and 27d, which brackets are secured to and extend upwardly from the evener bar 10. The brackets 27a, 27c, and 27d are provided with curved arms 28a, 28c, and 28d, respectively, which preferably extend rearwardly therefrom and provide bearings for stub shafts (not shown) which extent at right angles to the transverse shaft 25 and have keyed thereon bevel gears 29a, 29c, and 29d, respectively, which mesh with the bevel gears 26a, 26c, and 26d, respectively, as shown in Fig. 1.

The bracket 27b is provided with a curved arm 28b which extends forwardly therefrom and provides a bearing for a crank shaft 31 which extends forwardly at right angles to the transverse shaft 25. Said crank 31 is provided at its rear end with a bevel gear 29b which meshes with the bevel gear 26b on the shaft 25, and at its forward end said crank is equipped with a handle 32 within convenient reach of the operator's seat on the drawing tractor, so that the operator may turn said crank to rotate said shaft 25 through the bevel gears 29b and 26b, for the purpose hereinafter described.

Secured to and extending rearwardly from each of the stub shafts on which the bevel gears 29a, 29c and 29d are mounted is a universal or flexible driving coupling comprising telescoping members 35, 36, each of the members 35 being connected to its adjacent stub shaft by a universal joint 37. Each of the members 36 is connected by a universal joint 38 with a short shaft 39 (see Fig. 3) which extends rearwardly therefrom. Said shafts 39 are rotatably mounted in and extend through supporting brackets 40 which are secured to and extend upwardly from the front portion of each of the adjacent frame sections.

Suitably connected with and extending rearwardly from each of the short shafts 39 is an operating rod or shaft 41, each of which is provided with an externally screw threaded portion 42 at its rear end, which passes through and has threaded engagement in an internally screw threaded head 43, one of which heads is pivoted to the upper end of each central standard 17. As above described, the shifting bars 16 are connected to the upper portions of these standards, which are secured at their lower ends to the central tooth carrying bars 14 of each of the frame sections. Consequently by swinging the standards back and forth the several tooth carrying bars may be simultaneously and similarly rocked to adjust the position of the teeth mounted on them.

The operation of my improved mechanism is as follows: When the operator on the tractor desires to change the depth of penetration of the harrow teeth, or other earth working devices with which the implement may be equipped, he turns the crank handle 32 in the proper direction, and through the crank shaft 31 and bevel gears 29b and 26b the transverse shaft 25 is thereby rotated in its bearings, which, through the intermediate gearing, rotates the rods 41. By reason of the screw threaded engagement between said rods and the heads 43, this rocks the standards 17, and moves the shifting bars 16 longitudinally of the implement, thereby rocking the tooth carrying bars simultaneously to raise or lower all the teeth or other earth working devices carried thereby, as will be readily understood.

By the use of the bevel gear controlling mechanism above described the earth working devices carried by the various frame sections may all be adjusted simultaneously and uniformly regardless of the angular position which may be assumed by any one of the frame sections with respect to the others in conforming to the surface of the ground being cultivated, and when adjusted are held in the position in which they are set.

Mounting the control mechanism on the evener bar is advantageous over mounting it on the harrow frame sections in that in operation the evener bar is not subject to movement to the same degree as are the frame sections, and, therefore, it does not move about as much as it would if it were mounted on one of the frame sections, which makes it much easier for the operator on the tractor to operate it.

Each of the screw-threaded heads 43 above described is detachably mounted on its standard 17 by means of a bolt or a stud and cotter pin, and by so mounting said heads the position of the spring teeth 15 of one section may be adjusted relatively to those of the other section, so as to properly aline the teeth of all the sections. This is accomplished by withdrawing the bolt or cotter pin which holds the head 43 in position and removing said head from its bearing socket. Said head may then be screwed either forward or backward on its rod 41 the necessary amount to properly aline the teeth, after which it is replaced in position in its bearing and again secured in position.

I claim:

1. In a harrow, the combination with parallel frame sections flexibly connected laterally with each other, of transverse tooth carrying bars rockably mounted on said frame sections and each provided with earth working elements, and control means comprising bevel gear mechanism for simultaneously rocking said tooth carrying bars to adjust all of said earth working elements regardless of variations in the position of said frame sections with respect to each other.

2. In a harrow, the combination with parallel frame sections flexibly connected laterally with each other, of transverse tooth carrying bars rockably mounted on said frame sections and each provided with earth working elements, of means connecting the bars of each frame section to rock in unison, and control means comprising bevel gear mechanism connected separately with each frame section for simultaneously operating and adjusting all of said earth working elements regardless of variations in the position of said frame sections with respect to each other.

3. In a harrow, the combination with parallel frame sections flexibly connected laterally with each other, of transverse tooth carrying bars rockably mounted on said frame sections and each provided with earth working elements, means connecting the bars of each section together to rock in unison, and control mechanism comprising a transversely extending shaft, a plurality of sets of bevel gears operable by the rotation of said shaft, driving couplings between said bevel gears respectively and the tooth carrying bars of the several sections for simultaneously rocking said bars to adjust all of said earth working elements regardless of variations in the position of said frame sections with respect to each other, and means operable to rotate said shaft.

4. In a tillage implement, the combination with parallel frame sections flexibly connected laterally with each other, of transverse tooth carrying bars rockably mounted on said frame sections and each provided with earth working elements, an evener bar extending transversely of said frame sections and connected therewith, control mechanism mounted on said evener bar, devices on said frame sections, respectively, operable to rock the tooth carrying bars thereof, and means independent of said evener bar connecting said control mechanism with said devices for simultaneously rocking said tooth carrying bars by the operation of said control mechanism, to adjust all of said earth working elements regardless of variations in the position of said frame sections with respect to each other.

5. In a tillage implement, the combination with parallel frame sections flexibly connected laterally with each other, of transverse tooth carrying bars rockably mounted on said frame sections and each provided with earth working elements, an evener bar extending transversely of said frame sections and flexibly connected therewith, control mechanism mounted on said evener bar, devices on said frame sections, respectively, operable to rock the tooth carrying bars thereof, and flexible means independent of said evener bar connecting said control mechanism with said devices for simultaneously rocking said tooth carrying bars by the operation of said control mechanism, to adjust all of said earth working elements regardless of variations in the position of said frame sections with respect to each other.

6. In a harrow, the combination with parallel frame sections flexibly connected laterally with each other, of transverse tooth carrying bars rockably mounted on said frame sections and each provided with earth working elements, an evener bar extending transversely of said frame sections and flexibly connected therewith, devices on said frame sections, respectively, operable to rock the tooth carrying bars thereof, control mechanism mounted on said evener bar, and driving couplings comprising telescopic universal joint connections between said devices and said control mechanism for simultaneously rocking said tooth carrying bars by the operation of said control mechanism, to adjust all of said earth working elements regardless of variations in the position of said frame sections with respect to each other.

7. In a tillage implement, the combination with parallel frame sections flexibly connected laterally with each other, of transverse tooth carrying bars rockably mounted on said frame sections and each provided with earth working elements, an evener bar extending transversely of said frame sections and connected therewith, control mechanism comprising bevel gearing mounted on said evener bar, devices on said frame sections, respectively, operable to rock the tooth carrying bars thereof, and means connecting said bevel gearing with said devices for simultaneously rocking said tooth carrying bars by the operation of said control mechanism, to adjust all of said earth working elements regardless of variations in the position of said frame sections with respect to each other.

8. In a harrow, the combination with parallel frame sections flexibly connected laterally with each other, of transverse tooth carrying bars rockably mounted on said frame sections and each provided with earth working elements, and control means connected with the tooth carrying bars of the several frame sections and operable to adjust said bars in unison, said control means including a screw threaded head adjustable to aline the earth working elements of the several sections with respect to each other.

9. In a tillage implement, the combination with parallel frame sections flexibly connected laterally with each other, of transverse tooth carrying bars rockably mounted on said frame sections and each provided with earth working elements, an evener bar extending transversely of said frame sections and flexibly connected therewith, control mechanism comprising a shaft and bevel gears mounted on said evener bar, devices on said frame sections, respectively, operable to rock the tooth carrying bars thereof, and flexible means connecting said control mechanism with said devices for simultaneously rocking said tooth carrying bars by the rotation of said shaft, to adjust all of said earth working elements regardless of variations in the position of said frame sections with respect to each other.

10. In a tillage implement, the combination with parallel frame sections flexibly connected laterally with each other, of transverse tooth carrying bars rockably mounted on said frame sections and each provided with earth working elements, an evener bar extending transversely of said frame sections and flexibly connected therewith, control mechanism comprising a shaft and bevel gears mounted on said evener bar, devices on said frame sections operable to rock the tooth carrying bars thereof, and driving couplings comprising telescopic universal joint connections between said devices and said control mechanism for simultaneously rocking said tooth carrying bars by the rotation of said shaft, to adjust all of said earth working elements regardless of variations in the position of said frame sections with respect to each other.

11. In a harrow, the combination with parallel frame sections flexibly connected laterally with each other, of transverse tooth carrying bars rockably mounted on said frame sections and each provided with earth working elements, a shaft extending transversely of said frame sections, and bevel gear mechanism mounted on said shaft for simultaneously rocking said tooth carrying bars to adjust all of said earth working elements regardless of variations in the position of said frame sections with respect to each other.

12. In a harrow, the combination with parallel frame sections flexibly connected laterally with each other, of transverse tooth carrying bars rockably mounted on said frame sections and each provided with earth working elements, a shaft extending transversely of said frame sections, means for rotating said shaft, a longitudinally extending shaft mounted on each of said frame sections substantially at right angles to said transversely extending shaft and operatively connected with the tooth carrying bars thereof, and gear mechanism connecting said transversely extending shaft with said longitudinally extending shafts.

13. In a tillage implement, the combination with parallel frame sections flexibly connected laterally with each other, of transverse tooth carrying bars rockably mounted on said frame sections and each provided with earth working elements, means connecting said bars together to operate in unison, an evener bar extending transversely of said frame sections and connected thereto, rotary means mounted on said evener bar, means for operating said rotary means, a longitudinally extending shaft connected to one of the bars of each frame section, and means mounted on said evener bar and connected with said longitudinally extending shafts for transmitting rotary motion from said rotary means to said shafts.

WILLIAM L. PAUL.